Aug. 10, 1965        J. N. BEJAT                  3,200,231
         SPARK-EROSION MACHINE TOOL FOR DRILLING VERY SMALL
Filed Dec. 13, 1961    HOLES THROUGH THIN METAL SHEETS
                                              5 Sheets-Sheet 1

INVENTOR
JEAN N. BEJAT
Kenneth H. Murray
attorney

Aug. 10, 1965

J. N. BEJAT 3,200,231

SPARK-EROSION MACHINE TOOL FOR DRILLING VERY SMALL
HOLES THROUGH THIN METAL SHEETS

Filed Dec. 13, 1961

INVENTOR
JEAN N. BEJAT
Kenneth H Murray
Attorney

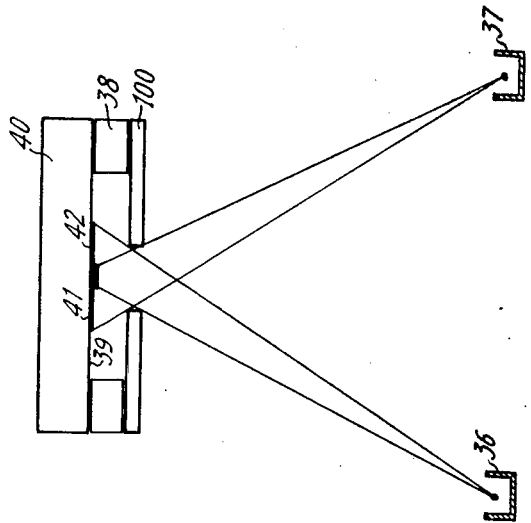
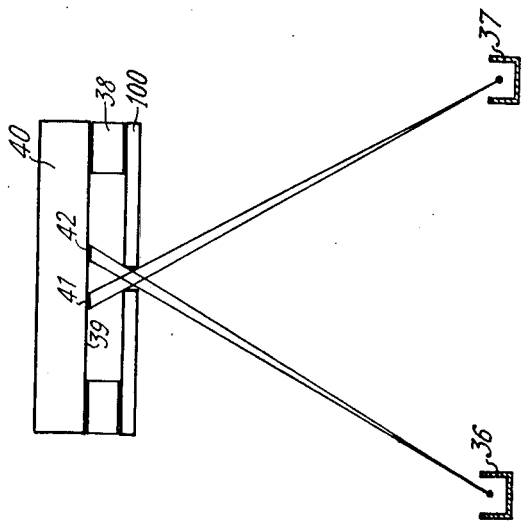

INVENTOR
JEAN N. BEJAT

3,200,231
SPARK-EROSION MACHINE TOOL FOR DRILLING VERY SMALL HOLES THROUGH THIN METAL SHEETS
Jean N. Bejat, 4 Rue Antoine Petit, Fontenay-aux-Roses, France
Filed Dec. 13, 1961, Ser. No. 159,107
Claims priority, application France, Dec. 15, 1960, 847,029
3 Claims. (Cl. 219—69)

This invention relates to spark-erosion machine tool intended for accurately drilling very small holes of prescribed size and shape, through thin metal sheets, as well as to a process for the manufacture of these tools.

The tool is made of one or several thin copper or molybdenum metal sheets or blades, with teeth on one of their edges, the length of the teeth and the thickness of the metal sheet being, respectively, approximately equal to, although slightly smaller than the length and width of the holes to be drilled. In operation the blades of the tool are perpendicular to the sheet to be drilled.

The thickness of the metal sheet and the dimensions of the tool's teeth being very small (typical values will be found below), the profiled or toothed sheet (or sheets) making up the tool is (or are) manufactured by a method including the following steps:

Making a photographic transparent negative to scale 1, with black background;

Coating the molybdenum or copper metal sheet with a photo-sensitive solution which, after being illuminated, turns into a coat capable to resist to the chemical or electrochemical baths used to attack copper or molybdenum;

Illuminating the coated sheet after having placed the photographic negative upon it;

Developing the exposed sheet;

Dissolving the non-exposed part of the coating;

Dissolving the metal sheet by chemical or electrochemical etching.

The tool is mounted in the tool-carrier of a spark-erosion machine and drilling is achieved by operating said machine.

The spark-erosion drilling is done by bringing the end of the tool, in this case, the end of the teeth, progressively closer to the metal sheet to be drilled which is placed in a dielectrical bath, then to trigger a train of electrical pulses producing sparks that shoot forth between the tool (negative electrode) and the sheet to be drilled (positive electrode), then, at last, to engage slowly, thanks to an automatic advance means, the tool within said sheet until the drilling through is completed.

To have an idea of the dimensions of the holes that can be drilled by the tool subject of this invention, one can consider the following example.

A tool cut from a copper or molybdenum sheet laminated to fifteeen or twenty microns makes it possible to drill, through a twenty-five microns thick molybdenum or nickel or tantalum sheet, rectangular holes the length of which can be of about one hundred and fifty microns and the width of about twenty-five microns.

In order to predetermine the dinmensions of a tooth intended to drill a hole of given size, one must take into account the dielectric gap between the two electrodes through which the sparks burst, i.e. about five microns on either side of the tool. Therefore, the length and thickness of the tooth should be smaller than the length and width of the hole by about ten microns; in other words a tooth intended to drill a hole of one hundred and fifty by twenty-five microns (150 x 25$\mu$) should measure approximately one hundred and forty by fifteen microns (140 x 15$\mu$).

As far as the kind of the metal constituting the tool blades is concerned, it should fulfill a plurality of conditions depending upon the kind of the metal of the sheet to be drilled. The tool of the invention is designed, principally although non exclusively, for machining masks or screens used in the vapor metallization of parts of semiconductive structures. Such a mask is made of a nickel, molybdenum, tantalum or inox-alloys sheets (Fe-Ni or Fe-Ni-Cr alloys), these metals being recommended in order to avoid detrimental pollution of the semiconductor structures. The kind of metal to be chosen for the mask must alloy neither with the semiconductor, nor with the vaporized metal and it must not pollute the semiconductor by diffusion at the vaporization temperature. For germanium, nickel or inox alloy may be used if spacers are placed between the mask and the semiconductor wafer to be treated and molybdenum and tantalum may be used with germanium in the absence of spacers and generally with silicon.

Having selected the kind of the metal sheets to be drilled by electro-erosive metalworking, the kind of the tool blade metal results through the following considerations.

(1) The tool metal must be able to undergo chemical or electrochemical etching operations without action upon the photoengraving coating.

(2) The erosion intensity at the cathode (tool) must be larger or at least substantially equal to the erosion intensity at the anode (sheet to be perforated). In other words the relative cathode erosion intensity $\gamma_K/\gamma_A$ must be smaller or at least not substantially greater than unity The following table shows erosion intensities for the metal chosen for tool blades and sheets to be drilled.

| Melting temp. in ° C. | Anode material | Cathode material | | | |
|---|---|---|---|---|---|
| | | Cu | | Mo | |
| | | $\gamma_A$ | $\gamma_K$ | $\gamma_A$ | $\gamma_K$ |
| 1,530 | Fe or inox steel | 5.87 | 3.57 | 2.19 | 2.07 |
| 1,455 | Ni | 9.20 | 2.77 | 1.71 | 1.48 |
| 2,600 | Mo | 2.57 | 3.08 | 2.63 | 2.01 |
| 3,000 | Ta | 1.93 | 3.72 | 1.61 | 3.07 |

It results from the above table that tools in Cu and Mo are congruent for electro-erosive metalworking of Fe, inox steel and Ni and that Mo and Ta are more difficult to be spark-eroded with the same tools; however, the relative cathode erosion intensity have still acceptable values.

As far as the height of the tooth is concerned, it should fulfil two conditions:

(1) to be compatible with the stiffness of the metal sheet in which said tooth is cut up;

(2) to be sufficient to make it possible to drill a reasonably large number of holes in succession. One must, indeed, take into account the unavoidable wear of the tooth in the course of the electro-erosive metalworking.

In the case of drilling of rectangular holes such as those taken above as an example, the height of the tooth should be betwen two hundred and fifty and five hundred microns.

The dimensions indicated in the foregoing make it evident that it is practically impossible to cut out such a tool by mechanical means. According to this invention, the manufacture of this tool is done by the photoengraving process, often used in the making of printed circuits.

The invention is now going to be described in detail in assuming that one wants to obtain a mask or screen allowing the emitter and base metal contacts of mesa type transistors to be vaporized therethrough. This description will be done in connection with the accompanying drawings in which:

FIGS. 4 and 5 show the way the masks must be used to metallize the emitter and base contacts of mesa type transistors.

Figure 1:
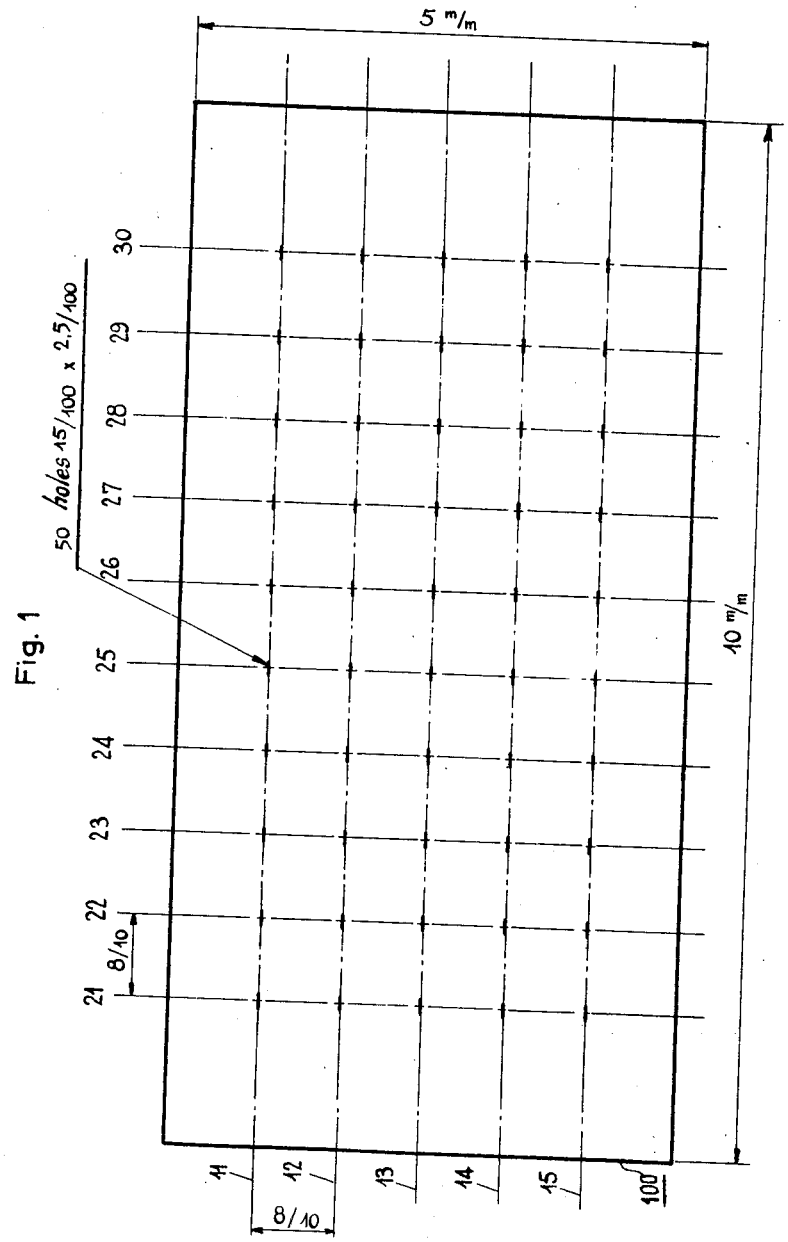
FIG. 1 shows a metal sheet, acting as a mask provided with fifty holes electro-eroded by the tool according to this invention.

As an example, it will be assumed as previously stated, that the tool is intended to obtain a mask for metallizing parts of semiconductive structures. Such a mask is shown in FIG. 1 and is made of a nickel, molybdenum, tantalum or inox steel sheet.

The nickel, molybdenum, tantalum or inox steel sheet 100 forming the mask is twenty microns thick, ten millimeters long and five millimeters wide. It comprises fifty holes located at the points of intersection of five horizontal lines 11 to 15 and ten vertical lines 21 to 30; these horizontal and vertical lines are 0.8 millimeter apart. All the holes are rectangular and of the same size, one hundred and fifty microns in length and twenty-five microns in width (150 x 25$\mu$).

Figure 2:
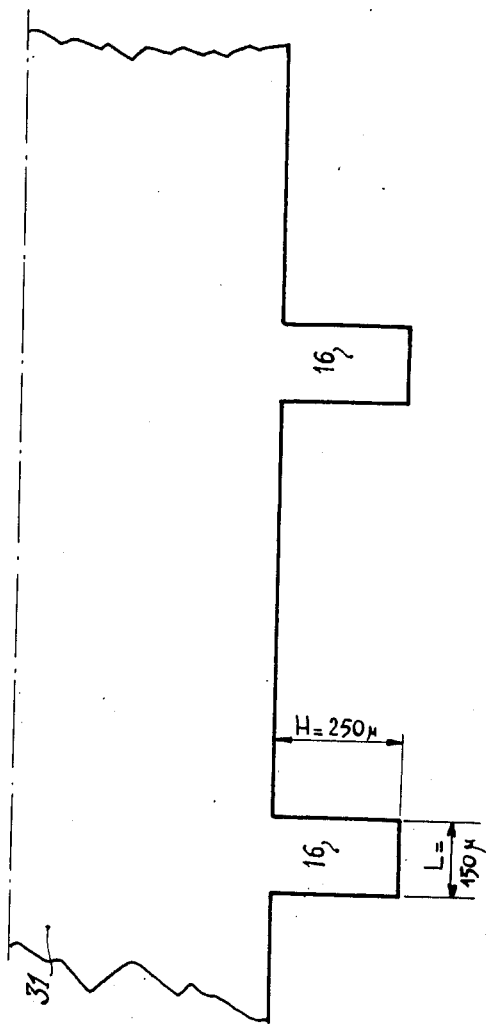
FIG. 2 shows a part view of a one blade tool made according to this invention and properly profiled and toothed in order to permit the drilling of the mask shown in FIG. 1.

The tool is made of five copper or molybdenum sheets 31–35, assigned respectively to hole rows 11 to 15 and identically cut so that each one forms a comb with ten rectangular teeth such as 16 (sheet 31 in FIG. 2) all of the same size. The length L of these teeth is slightly less than one hundred and fifty micron (150$\mu$) and their height H is between two hundred and fifty microns and five hundred microns, the first limit being assumed in FIG. 2. As for the thickness of said teeth, it depends, as has been already stated above, of the width of the dielectric gap through which the sparks burst between the edges of each tooth and the rim of the hole being drilled. Molybdenum or copper sheets, such as those which are readily available in a thickness of fifteen microns (15$\mu$), are quite convenient to make up a tool capable of drilling rectangular holes twenty-five microns wide.

The manufacture of the tool and, especially, the cutting up of the comb's teeth include the six following steps:

(1) Making of a large scale drawing (scale thirty, for example), in black on white background of the ten teeth profiled sheet.

(2) Photographic reduction in dianegative, in several copies, of said drawing, to bring it down to scale one, on transparent tracing with black background.

(3) Coating of the molybdenum or copper sheet selected for the manufacture of the tool with a photosensitive product such as the one commercially known under the trademark "Resifax," for example.

(4) After drying, exposure of the coated molybdenum or copper sheet, after having placed upon it the dianegative previously obtained, to an ultraviolet radiation light source.

(5) Developing of the photo-sensitized and exposed molybdenum or copper sheet, in order to make the outline of the tools appear. This outlien being in black on the photographic reduction has prevented the underlying "Resifax" from being exposed to the ultraviolet radiations. Therefore this part of the "Resifax" can be removed by a congruent solvent.

(6) Dissolution by electrochemical etching (in the case of molybdenum), or by chemical etching (in the case of copper), of the parts of the metal sheets from which the unexposed "Resifax" has ben washed out. Copper is etched by a $FeCl_3$ solution and molybdenum is dissolved by electrochemical etching in a bath of potassium ferricyanide and potash, the cathode in the bath being stainless steel.

Figure 3A:
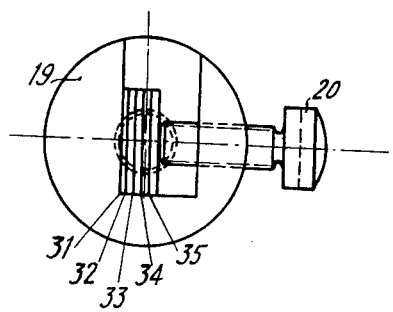
FIGS. 3a and 3b show a comprehensive view of a tool made of several blades held together in their relative position by a clamp.
Figure 3B:
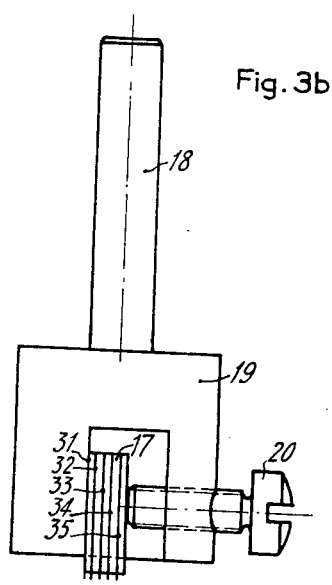

After these operations, one has obtained a number of profiled metal sheets, all alike, which can be stacked with spacers between them, the thickness of these spacers corresponding to the spacing of the horizontal lines 11 to 15 of FIG. 1. Five of these profiled sheets 31–35, separated from each other by spacers 17 are shown in FIGS. 3a and 3b held in a clamp comprising a shank 18, a yoke 19 and a tightening screw 20.

Experience has proved that, in order that the tool blades be held in strictly vertical planes, it is necessary that the tool-clamp and the spacers or shims be on the same level. Therefore, said tool-clamp and shims must be made of a very hard metal, such as tempered steel, that can stand accurate rectifying, making it possible to obtain sharp angles at the intersection of the faces.

The use for shims 17 of steel, instead of copper, which is a good conducting material but difficult to machine accurately, is not inconvenient because of the extremely low amperage of the electrical pulses necessary to the sparking.

Figure 6:
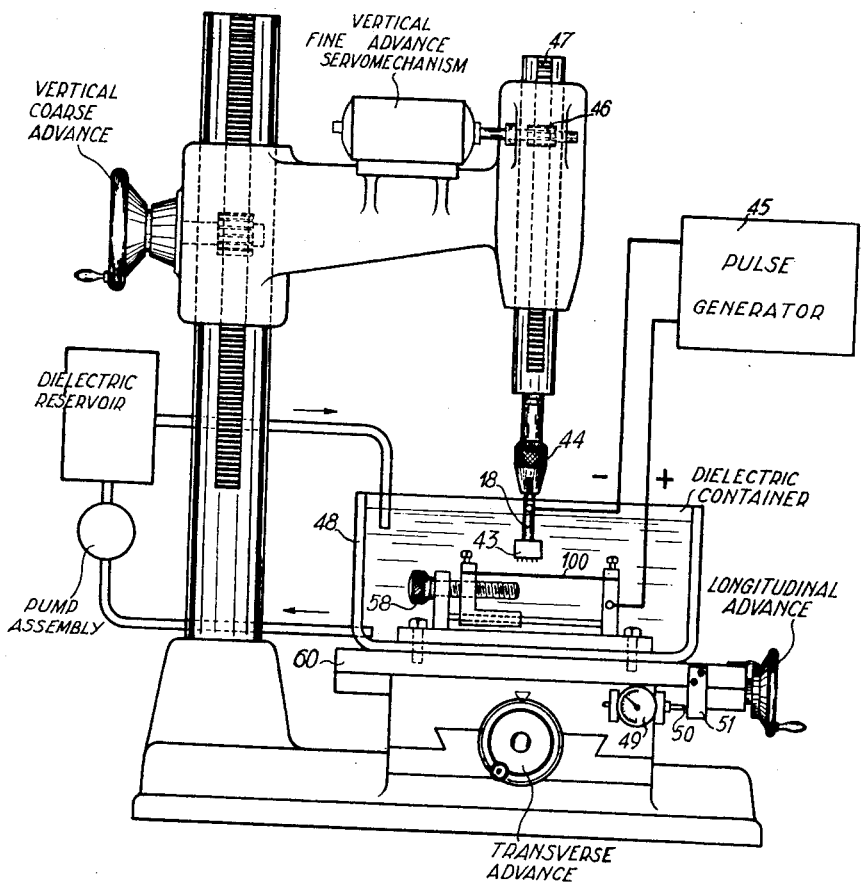
FIG. 6 represents a spark-erosion machine carrying the tool of the invention.
Figure 7:
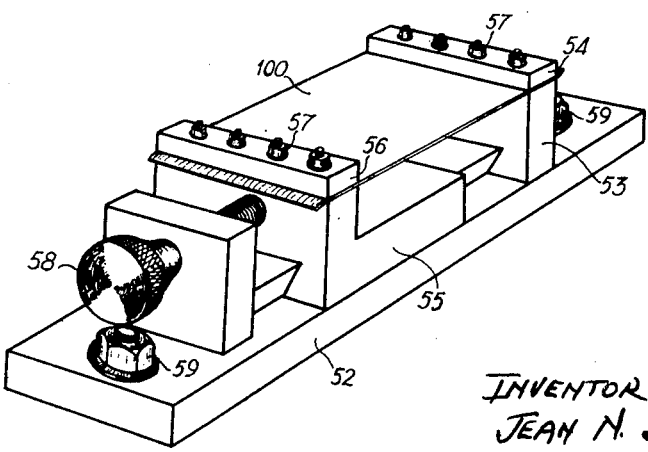
FIG. 7 represents a stretcher vice means for stretching the sheet to be drilled.

In order to drill with the tool thus assembled, the shank 18 should be clamped in the electrode holder of an electro-erosion machine, the metal sheet to be drilled being stretched on an adjustable vice adapter, itself clamped on the worktable of said machine (FIGS. 6 and 7).

The machine comprises a work head proper fitted on a rigid column carrying a spindle fed by a coarse advance hand means and a fine advance servomotor through pinion 46 and rack 47. In the lower part of the work head the shank 18 of the tool electrode 43 is chucked by precision spring collet 44.

The adjustable vice means comprises a base 52, a steady supporting flange 53, a movable supporting angle member 55 slidably mounted on a dovetailed bar and a control screw 58. Sheet 100 is clamped at its two ends and stretched between flange 53 and angle member 55 and two vice clamp members 54 by means of bolts 57. The sheet carrying vice means is placed in a dielectric fluid container 48 and clamped to the work table 60 by means of bolts 59. A pump assembly takes care of an efficient circulation of the dielectric fluid from a reservoir tank to the dielectric fluid container. The generator 45 comprises all the equipment required for generating the pulses, for regulating the servomotor and for the operation of the machine tool.

Sheet 100, perforated with rectangular holes, has been

In operation, tool 43 is brought progressively nearer to metal sheet 100 immersed in dielectrical fluid container 48 while electrical sparks burst between the tool and the sheet to be drilled.

If holes should be drilled through a nickel sheet, it will be preferable to use a copper tool, because the wear of the latter will be only of about thirty percent with respect to the amount of matter taken away from the sheet to be machined (see the above table). If the nickel sheet is thirty microns thick, the making of a mask will wear the tool by nine to ten microns.

If the height of the tool's teeth is between two hundred and fifty microns and five hundred microns, it will be possible to use this tool to manufacture a series of between fifteen and thirty masks, the holes of which will all be of substantially the same dimensions.

Sheet 100, perforated with rectangular holes, has been used by the applicant as a mask for vaporizing the emitter and base electrodes of mesa type transistors.

It is known (FIGS. 4 and 5), that the dimensions of said electrodes 41 and 42 are similar to those of the holes of the mask and that their spacing depends, on the one hand, of the arrangement of sources 36 and 37 generative of metallic vapor and, on the other hand, of the thickness of spacers 38 inserted between the mask 100 and the surface 39 of the semiconductive structure 40. One can see that, with an identical arrangement of sources 36 and 37 and the same spacers 38, a variation in the width of the holes of the mask, will mean a variation in the spacing of the metalized parts 41 and 42. Therefore, the semiconductive devices will exhibit different electrical characteristics, and can even be deteriorated and ineffective if the metallized parts are superimposed (FIG. 5). That is why it is important, in the case of this particular example, to use masks in which all the rectangular holes have identical widths which can be done by using multi-blade tools in which all the blades are machined from a given laminated sheet.

In short, the semiconductive elements manufactured with the help of masks made with the tool according to the present invention show a better homogeneity in the arrangement of their metallized and alloyed components and, therefore in their final characteristics.

It is also possible to machine more complicated drillings with the tool of the invention, particularly with a single toothed blade tool. The metal sheet to be drilled is integral with a table adjustable along two rectangular coordinates or with a rotary table and it is therefore possible to shift or to rotate this sheet in relation to the tool.

Electro-erosion machines have been developed comprising a compound table with longitudinal scales and graduated dials (see 49, FIG. 6) reading $10\mu$ per division. By using slip gauges to be inserted between the feeler 50 and the contact member 51, it is possible to maintain settings of $5\mu$. Other machines are equipped with an optical table instead of a standard compound table. Longitudinal and transverse movement of the table are measured by two glass scales which have an error of less than $2\mu$. These glass scales are fitted under the table top and are fully protected. Both scales can be read through a common eyepiece, a change-over device allowing alternate focusing on the longitudinal glass scale and the transverse glass scale. The precision eyepiece makes it possible to take readings with an accuracy of $1\mu$. Lastly rotary tables are built which have a disc with a graticule and concentric rings fitted at the fulcrum of the table. The table is driven by a precision worm gear with a ground worm. The degrees are read from a clear circular graduation at the circumference of the table, whereas the minutes are indicated on a special graduated drum. The reading of these rotary tables is 10 seconds.

The above machines permit very fine displacements of the tool with respect to the sheet to be drilled. It results that, in order to achieve several sets of holes very close one to the other, it is not necessary to use a tool with a large number of blades separated one from the other by very thin spacers. For example, to obtain a mask of the same dimensions as that shown in FIG. 1 but presenting, at each point of intersection of a horizontal line and of a vertical line a group of three rectangular holes the opposite rims of which are thirty microns apart, one needs only to use the tool that was described in connection with FIGS. 3a and 3b. With that tool one makes a first series of holes. Then one shifts the adjustable table of coordinates by fifty-five microns and one can make the second series of holes. Next, one shifts again the adjustable table by fifty-five microns and the third series of holes can be drilled.

Several series of tests were made by the applicant. These tests were of two kinds:

(a) In a first series of tests, the range of width of the holes that could be drilled was determined in varying:

On the one hand, the kind of material of which the tool is made and the thickness of the active blades of said tool;

On the other hand, the kind of material of which the sheet to be drilled is made and the thickness of said sheet.

Table I summarizes the results that were obtained. The right-hand column of this table indicates the excess, on either side of the tool, of the half-width of the hole in relation to the half-width of the tool.

Table I

| Tool | | Machined Metal | | With of the holes in $\mu$ | Lateral Excess of the hole in $\mu$ |
|---|---|---|---|---|---|
| Metal | Thickness in $\mu$ | Metal | Thickness in $\mu$ | | |
| Copper | 20 | Nickel | 30 | 30 | 5 |
| Molybdenum | 15 | Molybdenum | 15 | 27 | 6 |
| Do | 15 | ----do---- | 25 | 27 | 6 |
| Do | 25 | ----do---- | 25 | 32 | 3.5 |

(b) In a second series of tests one tried to calculate the value of the spacing between the opposite rims of two rectangular holes the longitudinal axis of which are parallel or, in other words, the width of the solid interval between holes. This result has been obtained in varying:

(1) the thickness of the molybdenum tool;
(2) the thickness of the sheet to be drilled, which was also made of molybdenum;
(3) the extent of the shifts of the adjustable worktable.

The results that I obtained are summarized in Table II below:

Table II

| Tool | | Machined Metal | | Shifts of the table in $\mu$ | Average distance between two holes in $\mu$ |
|---|---|---|---|---|---|
| Metal | Thickness in $\mu$ | Metal | Thickness in $\mu$ | | |
| Molybdenum | 15 | Molybdenum | 15 | 70 | 50 |
| Do | 15 | ----do---- | 15 | 60 | 38 |
| Do | 15 | ----do---- | 25 | 60 | 36 |
| Do | 25 | ----do---- | 25 | 70 | 42 |

It has been assumed previously that the sheets to be drilled were in nickel, molybdenum, tantalum and stainless steel. Stainless steel is here an alloy of from 70 to 74% iron, about 18% chromium, about 8% nickel and from 0 to 4% molybdenum.

Anyone skilled in the art will easily understand the many possibilities of the tool described above, which can be used in other technical fields than that of transistors which has been considered here as an example, whenever sheets of say from tens of microns thick are to be drilled. It is to be noticed that the thickness of the tool blades is of the same order, say from one half to two times, the thickness of the sheet to be drilled. In particular, this tool can be used in the manufacture of test patterns, of grids for electron tubes, of periodic structures for delayed wave oscillating circuits (see on this subject the article by H. A. C. Hoog, entitled, "Photo-Etching Molybdenum Foil," published in the British Review, "The Institution of Electrical Engineers," of December 1958, Part "C," pages 614 to 616).

What I claim is:

1. An electro-erosion machine for producing minute apertures comprising a reservoir of dielectric fluid; an anodic workpiece immersed in said dielectric fluid; a cathodic tool adjacent said workpiece; said cathodic tool including a plurality of planar sheets in spaced juxtaposition to one another; each of said sheets including a continuous upper portion and a discontinuous lower portion defined by a plurality of discrete depending teeth integral with said upper portion; spacer elements interposed in the spaces between said sheets; and mounting means clamping said sheets and spacer elements in assembeld relationship with said spacer elements extending only between the upper portions of said sheets; said sheets being immersed in said dielectric fluid with said depending teeth being spaced opposite said workpiece whereby operation of said machine creates electrical discharge between said workpiece and said sheets to burn rows of minute apertures in said workpiece; the longitudinal distance between adjacent apertures in a row being determined by the spacing between adjacent teeth on the sheet opposite that row and the transverse distance between adjacent rows of apertures being determined by the thickness of the spacer elements between corresponding adjacent sheets; and the length and width of each individual aperture being determined respectively by the length of the associated individual tooth and the thickness of the sheet from which that tooth depends.

2. An electro-erosion machine as defined in claim 1 wherein said sheets are formed of molybdenum.

3. An electro-erosion machine as defiined in claim 1 wherein said sheets are formed of copper.

References Cited by the Examiner

UNITED STATES PATENTS

| | | | |
|---|---|---|---|
| 1,271,606 | 7/18 | O'Loughlin | 30—172 |
| 2,594,174 | 4/52 | Johnson | 15—200 |
| 2,826,676 | 3/58 | Fullerton et al. | 219—119 |
| 2,909,641 | 10/59 | Kucyn | 219—69 |
| 3,031,302 | 4/62 | Bayer | 96—36 |
| 3,058,895 | 10/62 | Williams | 219—69 X |
| 3,067,317 | 12/62 | Buro | 219—69 |
| 3,079,254 | 2/63 | Rowe | 96—36 |

FOREIGN PATENTS 1,188,527   3/59   France.

RICHARD M. WOOD, *Primary Examiner.*